July 2, 1963 J. O. FUNDINGSLAND 3,096,038
TAPE STORAGE APPARATUS
Filed Jan. 21, 1959 3 Sheets-Sheet 1

INVENTOR
John O. Fundingsland
BY
ATTORNEYS

INVENTOR
John O. Fundingsland
BY

ATTORNEYS

July 2, 1963 J. O. FUNDINGSLAND 3,096,038

TAPE STORAGE APPARATUS

Filed Jan. 21, 1959 3 Sheets-Sheet 3

INVENTOR

John O. Fundingsland

BY

ATTORNEYS

United States Patent Office 3,096,038

Patented July 2, 1963

3,096,038
TAPE STORAGE APPARATUS

John O. Fundingsland, Colorado Springs, Colo., assignor to Teleprompter Corporation, New York, N.Y., a corporation of New York Filed Jan. 21, 1959, Ser. No. 788,187
2 Claims. (Cl. 242—55.14)

The present invention relates to the recording and playback of intelligence on strip-like record media such as tapes, and more particularly to apparatus for the storage of such media and the transport thereof past recording and playback or reading devices. The invention provides apparatus of this character which greatly facilitates the storage and handling of such media, the engagement and disengagement thereof with and from the recording and playback or reading devices, and the drive thereof past such devices when so engaged.

The invention provides apparatus whereby a strip-like record medium such as a tape, wound partly on a supply and partly on a take-up reel, may be driven from one reel to the other and back by the application of power at a single point, for example to one of the reels, or to the tape between them, the tape being maintained taut irrespective of the direction in which and the speed at which the tape is driven.

According to the invention the two reels are coupled to rotate together, independently of the tape, by a movable linkage or coupling which provides a continuously variable ratio of speeds for the two reels, the ratio extending from a given value at one limit, different from unity, to approximately the reciprocal of that value at the other limit.

This coupling moreover includes means which cause the coupling to tend to move, and which thereby cause the speed ratio to tend to shift continuously toward one limit, upon rotation of the reels in one pattern of directions, and toward the other limit upon reel rotation in the opposite pattern of directions. In a presently preferred embodiment as will be further set forth here, the two reels always rotate in opposite directions. When an intermediate limiting valve is imposed on the speed ratio, by the tape, the coupling remains stationary in the position corresponding to the instantaneously imposed intermediate limiting valve, but the trend of the coupling toward higher speed ratios keeps the tape taut. The tape is so applied to the reels that tape motion in one direction is produced by reel rotation according to one of these patterns while tape motion in the opposite direction is produced by reel rotation according to the opposite pattern, and so that in addition, for either direction of tape travel, the supply reel is the reel whose relative speed declines while the take-up reel is the reel whose relative speed increases.

Accordingly the tape may be driven from one reel to the other, at any speed, and the tape is always kept taut between the two reels, although a driving force is applied at only one point, as for example to the tape itself at a point thereon between the two reels, or alternatively to the supply reel, or to the take-up reel. This reversability of tape is important in view of the necessity of rewinding the tape, for example between recording and playback, or between repeated playbacks. The invention will now be further described by reference to the accompanying drawings in which.

Figure 1:
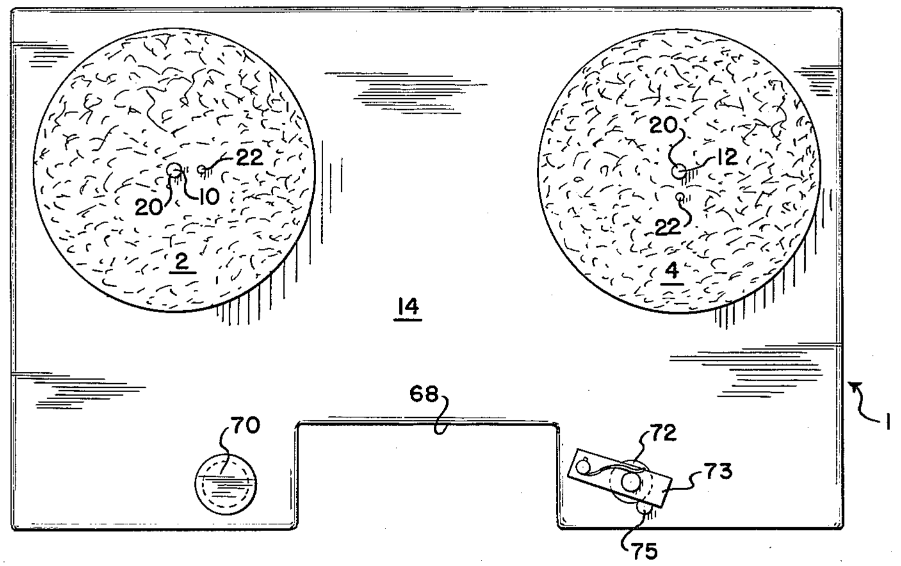
FIG. 1 is a top plan view of one embodiment of the invention.
Figures 2, 3:
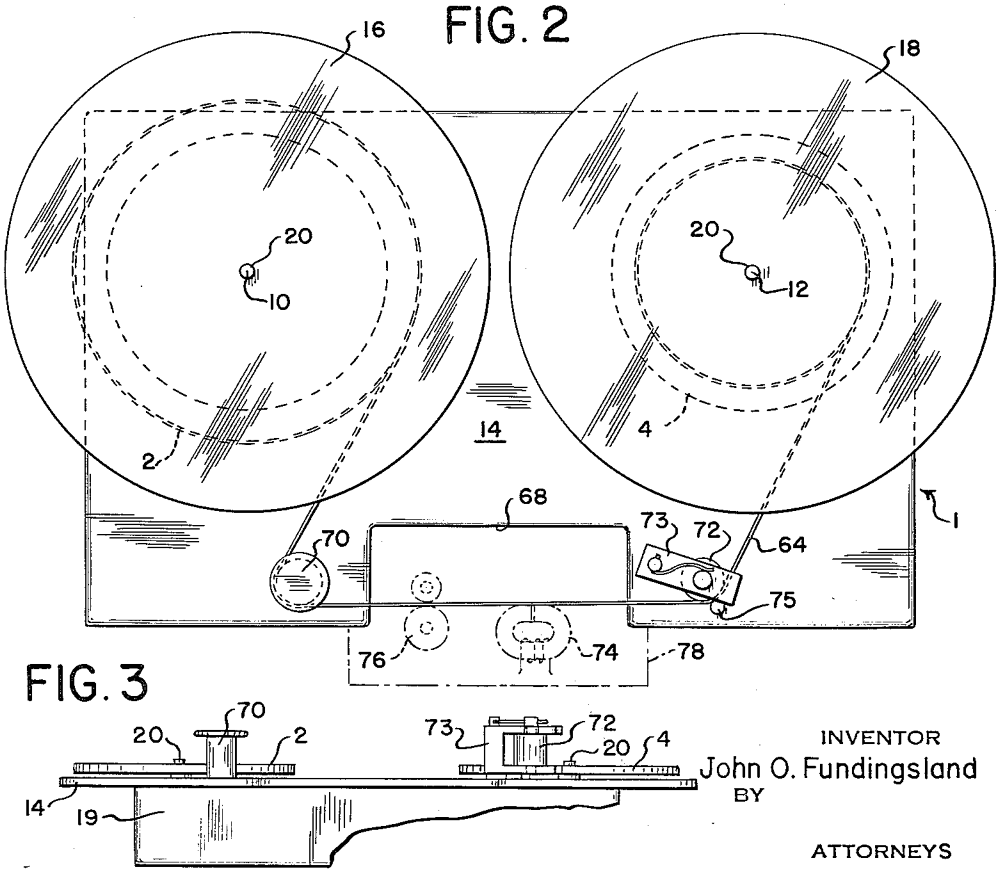
FIG. 2 is a top plan view of the apparatus of FIG. 1, but showing it in operative engagement with two reels having a tape wound thereon.
FIG. 3 is a front elevational view of the apparatus of FIG. 1.
Figure 7:
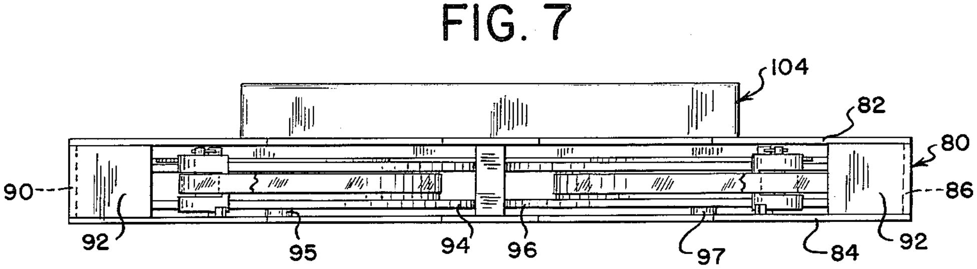
FIG. 7 is a front elevational view of another embodiment of the invention.

Referring to FIGS. 1 to 6, the tape storage unit there represented, generally indicated at 1, includes two disks identified at 2 and 4, journaled in bearings 6 and 8 (FIG. 4) for rotation about spaced parallel axes indicated at 10 and 12. The bearings 6 and 8 are mounted on a plate 14 so that the disks 2 and 4 lie substantially in a common plane on one side of the plate, as seen in FIG. 3, the opposite side of the plate (which may be the lower side) being that seen in FIG. 4. The disks 2 and 4 are adapted to support gravitationally or otherwise supply and take-up reels 16 and 18, as indicated in FIG. 2. Each of the reels 16 and 18 may serve as either the supply reel or take-up reel. Consequently these functions are likewise alternatively associable with each of the disks 2 and 4. In one embodiment, as illustrated in FIG. 1, the disks 2 and 4 are provided on their upper surface each with a centering pin 20 for the removable support of one of the reels 16 and 18 and with an eccentric driving pin 22 to compel that reel to rotate with the disk on which it is supported.

The tape, identified at reference character 64 in FIG. 2, is wound partly on one reel and partly on the other, and is led from one to the other over two idler rollers 70 and 72. If desired, one of these may be journaled in a spring-mounted lever, as indicated at 73, working against a stop 75, but this is not essential. Between rollers 70 and 72 the plate 14 may be cut away to provide a reentrant opening 68, for engagement of the tape with a signal transducer device for the recording of signals thereon or for the playback of signals therefrom. Conveniently also the drive for advance of the tape past the transducer may be applied to the tape between rollers 70 and 72. A transducer 74 and a drive capstan 76, shown in dashed lines, are shown so engaged with the tape between rollers 70 and 72 in FIG. 2. The transducer and capstan form part of a sound or other intelligence recording and reproducing device fragmentarily indicated at 78 which, as such, forms no part of the invention but with which the tape storage and transport unit of the invention is associable, the device 78 conveniently including an emplacement dimensioned to receive the unit 1 so as to position the transducer and capstan with reference thereto as indicated in FIG. 2. The capstan 76 may comprise as shown two rolls or rollers between which the tape is fed, one or both of the rolls being reversibly driven by a motor not shown. The transducer shown is of the magnetic type, for recording of signals by magnetization of magnetizable particles in or on the tape or for the reproduction of signals so recorded. This is however exemplary only. Other methods of recording and reproducing intelligence may be used.

Figure 4:
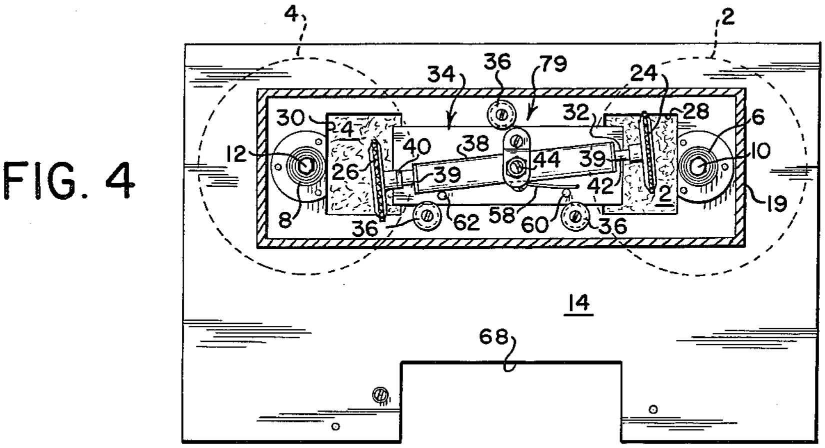
FIG. 4 is a bottom plan view of the apparatus of FIG. 1 with a protective cover removed to show the coupling mechanism which couples the reels together, the apparatus as seen in FIG. 1 being turned over from right to left or from left to right to produce the view of FIG. 4.
Figures 5, 6:
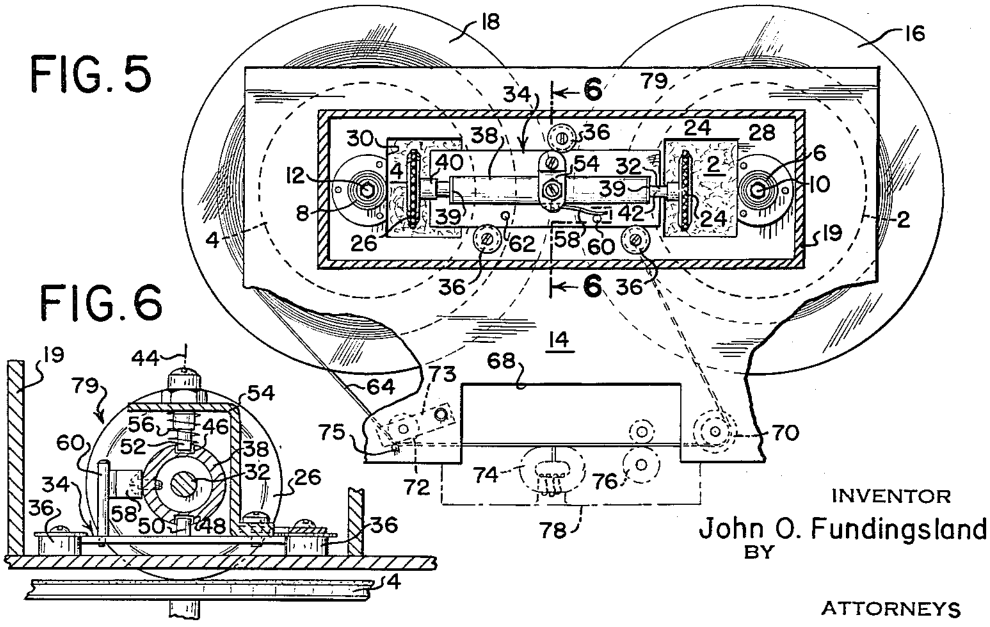
FIG. 5 is a bottom plan view of the apparatus of FIG. 2, the coupling mechanism being again exposed.
FIG. 6 is a sectional view on the line 6—6 of FIG. 5.

Independently of the tape, the disks 2 and 4 are mechanically coupled together by means of a linkage or coupling generally indicated at 79 in FIGS. 4 to 6, which may be enclosed in a protective box 19, affixed to the underside of plate 14 and which is shown in FIGS. 4 and 5 with the cover thereof removed.

The disks 2 and 4 are made of material having, on the side opposite the reels, i.e. on the side visible in FIG. 4 at openings 28 and 30 in plate 14, and in conjunction with the linkage or coupling wheels 24 and 26 presently to be described, a coefficient of friction sufficient to minimize slippage between the disks and linkage wheels. Wheels 24 and 26 form part of the coupling 79. To permit engagement between each of these linkage wheels and one of the disks, the plate 14 is cut out as indicated at 28 and 30 in FIG. 4 over a portion of the area occupied by the disks. The cut-out apertures 28 and 30 are positioned between the axes 10 and 12.

The tape storage unit of FIG. 1, when combined with a pair of tape reels as illustrated in FIG. 2, provides a tape transport system permitting the transfer of tape from one reel to the other in either direction by the application of a driving force either to the tape in the portion thereof between the two reels, or to either one of the reels, or to the mechanical coupling between them comprising the wheels 24 and 26, and this system operates to maintain the tape in a taut condition irrespective of the direction in which and the speed at which the tape is driven.

The coupling wheels 24 and 26 are pinned to a common shaft 32 and hence rotate about collinear axes at a fixed separation which differs from, and in the embodiments illustrated is less than the separation of the disk axes 10 and 12. The wheels are supported so as each to engage frictionally one of the disks 2 and 4, and their separation on shaft 32 is such that these points of engagement, while movable within limits, lie between the axes 10 and 12, i.e., in geometrical terms, between parallel planes respectively containing those axes and which are perpendicular to the plane defined by those axes. Consequently the disks 2 and 4, as coupled together by wheels 24 and 26, will always rotate in opposite directions.

Means are provided to permit translational movement of the linkage wheels together so as to change simultaneously in opposite senses the spacing of their points of contact or engagement with the disks 2 and 4 from the disk axes 10 and 12. Thus with movement of the wheels 24 and 26 to the left in FIG. 4, the spacing of the point of contact of wheel 24 with disk 2 from axis 10 increases while the spacing of the point of contact of wheel 26 with disk 4 from axis 12 decreases, and vice versa for movement of wheels 24 and 26 to the right in FIG. 4.

In the embodiment of FIGS. 1 to 6, the means which permit this translational movement comprise a carriage 34 which is supported on flanged guide rollers 36 journaled on pins affixed to the plate 14. These rollers define a path of motion for the carriage 34 which is parallel to the plane defined by the disk axes 10 and 12. A sleeve 38 having a bearing 39 at each end thereof is mounted on the carriage 34 and provides support for the shaft 32. A thrust collar 40 on one end of the shaft 32 between wheel 26 and the adjacent bearing 39 and a thrust spring 42 engaged between the other bearing 39 and the linkage wheel 24 insure that translation of the carriage is accompanied by translation of linkage wheels.

When the carriage 34 is at the left end of its travel in FIG. 4 wheel 26 engages disk 4 at a short radius from axis 12, and wheel 24 engages disk 2 at a large radius from axis 10. Assuming for the moment the wheels 24 and 26 now to be fixed with respect to plate 14 except for rotation thereof together with their supporting shaft 32 about their own axes, it is clear that rotation of disk 4 will be accompanied by rotation of disk 2, but that disk 2 will rotate at lower angular speed than disk 4, if wheels 24 and 26 are of the same diameter, as is convenient.

Conversely if carriage 34 is shifted to the right end of its travel in FIG. 4, wheel 26 will engage disk 4 at a large radius thereon and wheel 24 will engage disk 2 at a small radius thereon. For the same assumption concerning possible motions of the wheels 24 and 26 relative to plate 14, rotation of disk 4 will be accompanied by rotation of disk 2, but disk 2 will now turn faster than disk 4.

With respect to the plate 14 the wheels 24 and 26 are however susceptible not only to the translational motion of carriage 34 (in addition to their own rotation about the axis of shaft 32) but also of a rotational motion which changes the orientation of their own axes of rotation with respect to the disk axes 10 and 12. In the embodiment of FIGS. 1 to 6 this rotational degree of freedom is provided by a pivotal mounting for the bearing sleeve 38 in the carriage 34 about an axis indicated at 44 (FIG. 6) which is parallel to the axes 10 and 12.

As illustrated in FIG. 6, the bearing sleeve 38 is provided with shallow transverse collinear bores 46 and 48. A pin 50 extends from the carriage 34 into one of these bores and a pin 52 extends from a bracket 54, fixed to carriage 34, into the other. The pins are made to extend only part way into these bores and a spiral spring 56 is engaged about the pin 52 between the sleeve 38 and the bracket 54 so as to stress the sleeve toward the carriage and toward plate 14. Since the bearings 6 and 8 limit the end play or axial motion of the disks, the effect of spring 56 is to stress the wheels 24 and 26 against the disks 2 and 4.

Accordingly, whatever the position of wheels 24 and 26 together in their translational motion toward and away from the disk axes 10 and 12, they are permitted to rotate together about the axis 44. In one position, that of equilibrium for the tape storage and transport unit of the invention when in operation as illustrated in FIG. 5, the axis of shaft 32 is aligned parallel to the plane of axes 10 and 12. Preferably indeed the axis of shaft 32 will then lie in that plane by virtue of a position of axis 44 therein, so that in this equilibrium position the axis of rotation of each of the linkage wheels 24 and 26 intersects the aixs of rotation of the disk which it frictionally engages.

The wheels 24 and 26 are however not restricted to the angular positions thereof about axis 44 illustrated in FIG. 5, and the invention includes means which bias the wheels to occupy a different position, as illustrated in FIG. 4, wherein the axis of shaft 32 and hence the axes of the wheels 24 and 26 are skew with respect to the disk axes 10 and 12. In the embodiment of FIGS. 1 to 6 these means comprise a leaf spring 58 engaged between barrel sleeve 38 and a stop 60 fixed to the carriage 34. This spring tends to rotate the wheels 24 and 26 about the axis 44 to a limit established for example by means of a pin 62 fixed to the carriage 34 and against which the barrel 38 comes to rest.

The consequence of this skew rest position for the wheels 24 and 26 with respect to the disks 2 and 4 with which they engage is that a rotation applied to either of the disks or to either of the wheels 24 and 26 produces not only a rotation of all four of these members but also a translation of the wheels 24 and 26, with their carriage, to increase for one wheel and to decrease for the other the separation of such wheel from the axis of the disk with which it engages.

Consequently, absent any means external to the linkage provided by wheels 24 and 26 restricting the relative speed ratio of disks 4 and 6, rotation of either of the disks or of either of the linkage wheels produces translation of the linkage wheels and, as a consequence of this translation, a continuous change in the speed ratio of the disks. This change in the speed ratio persists until the carriage 34 reaches the end of its permissible travel, which may for example occur when the linkage wheels strike against the edges of the apertures 28 and 30.

Specifically, when disk 2 rotates counterclockwise as seen in FIG. 4 (clockwise as seen in FIG. 1), disk 4 rotates clockwise as seen in FIG. 4, and carriage 34 moves from right to left in FIG. 4, raising the angular speed of disk 4 relative to that of disk 2. Accordingly, in this pattern of directions of rotation for the two disks, disk 2 is associated with, and drives the supply reel, whereas disk 4 is associated with and drives the take-up reel. On the other hand, when disk 2 rotates clockwise as seen in FIG. 4 (counterclockwise as seen in FIG. 1), disk 4 rotates counterclockwise as seen in FIG. 4 and carriage 34 moves from left to right in FIG. 4, raising the angular speed of disk 2 relative to that of disk 4. Accordingly, in this pattern of directions of rotation for the two disks, disk 4 is associated with and drives the supply reel whereas disk 2 is associated with and drives the take-up reel.

As illustrated in FIG. 2, the reel 16 is so applied to disk 2 (or, to say the same thing in other words, the tape is so laid on that reel) that for clockwise rotation of the disk, as there seen, the tape is paid out by reel 16 and vice versa. Conversely, reel 18 is so applied to disk 4 that for counterclockwise rotation of disk 4, as there seen, the tape is taken up by reel 18, and vice versa. The first of the above-described patterns of directions of rotation therefore advances the tape from left to right past the transducer in FIG. 2, and the second pattern advances it in the opposite direction.

The direction of carriage travel just set forth for the recited patterns of directions of disk rotation would be reversed if spring 58 were arranged to rotate or bias the linkage wheels clockwise instead of counterclockwise about axis 44, as seen in FIG. 4, and with such a reversal of spring 58 the supply direction of disks 2 and 4 in FIGS. 1 and 2, would be counterclockwise instead of clockwise, and their take-up direction would be clockwise instead of counterclockwise.

According to the invention the wheels 24 and 26 are allowed a range of translation great enough so that the speed ratios between disks 2 and 4, as determined by wheels 24 and 26, corresponding to the extreme positions of the wheels are at least as great as the speed ratios required to keep the tape taut for the condition of a full reel of tape on one disk and an empty reel on the other, and vice versa.

When there are applied to the disks two tape reels 16 and 18 bearing a tape 64 one end of which is wound on one reel and the other end of which is wound on the other reel as illustrated in FIG. 2, the tape defines, for the instantaneously existing distribution of tape between the two reels, the relative angular speed at which the reels must rotate in order to maintain the tape taut between them.

The tape, by defining for the instantaneously existing distribution of tape between the reels the speed ratio of the two disks which will hold the tape taut, likewise defines for that distribution the translational position of the linkage wheels at which slippage between the linkage wheels and disks will be minimized. Via the motion of carriage 34, the linkage wheels will shift to the position so defined. In this position the linkage wheels will moreover rotate about their axis 44 to bring their individual axes and the collinear axis of the shaft 32 into parallelism with the plane defined by axes 10 and 12. When, as is desirable, the axis of shaft 32 then lies in this plane, the individual axes of rotation of wheels 24 and 26 will intersect respectively disk axes 10 and 12.

As the tape is unwound from one reel and wound up on the other, the radii of the outermost coils of tape on the two reels continuously change in opposite directions, and the speed ratio of the disks which will keep the tape taut continuously changes accordingly. The continuous change in the radii of the outermost coils of tape on the two reels is accompanied by a continuous, gradual translation of carriage 34 with the linkage wheels, the position of the carriage at every instant being that at which the speed ratio of the wheels, as defined by that carriage position, corresponds to the instantaneously existing values of these radii. Manifestly, when the driving force is applied to the tape in the "bight" thereof between idler rollers 70 and 72, or to the supply reel, it is not the tape but the linkage mechanism which transmits a driving force to the take-up reel.

The action of the spring 58 is such that, but for the tape as a limiting factor on the ratio of speeds at which the reels turn, the speed of the take-up reel would continuously increase relatively to that of the supply reel until the carriage 34 reaches the limit of its travel. For this reason any slack in the tape existing when the reels are stationary, such as might be introduced for example when the reels are first applied to the disks, is immediately taken up when a driving force is applied to the system. If such slack is present, the speed ratio of the reels begins to shift as soon as the driving force is applied. For example, in the arrangement illustrated in FIG. 2, if slack exists in the tape between the reels, rotation of the capstan 76 will put all such slack between the capstan and the take-up reel, and the reels will begin to rotate as soon as the supply reel is pulled into rotation by the tape, now taut between the supply reel and the capstan. As soon as such rotation begins, the carriage will begin to shift, and it will shift past the position producing a speed ratio corresponding to the radii of the outermost tape coils on the two reels. The slack will therefore be taken up on the take-up reel.

When all the slack has been so taken up the ratio of the take-up reel speed to supply reel speed is forceably reduced, as the tape comes taut, and the carriage shifts backward, under the compulsion of the frictional engagement between the linkage wheels and disks, towards positions defining speed ratios of the reels more nearly equal to unity. This will occur because, the translational position of the linkage wheels now corresponding to a speed ratio higher than that permitted by the tape, the linkage wheels will rotate about their transverse axis 44 to a skew position opposite to that favored by the bias spring 58.

Consider FIGS. 2, 4 and 5, and assume reel 16 in FIG. 2 to be the supply reel. When the slack in the tape has been taken up, the carriage will be too far to the left in FIG. 4 for the speed ratio now imposed by the tape, which has just come taut. In this carriage position wheel 26 tends to rotate too fast for the imposed speed ratio and wheel 24 too slow. Disks 2 and 4, as seen in FIG. 4, are rotating clockwise and counterclockwise respectively. Wheel 26 therefore tends to climb "up" on disk 4, and wheel 24 tends to climb down on disk 2, producing a rotation of the two linkage wheels together clockwise about axis 44. As this rotation proceeds past the neutral or equilibrium position shown in FIG. 5, the wheels come into engagement with the disks at locations such that a component of the motion imposed on the linkage wheels is lengthwise of their individual axes of rotation. The carriage is accordingly shifted from left to right in FIG. 4, towards lower speed ratios. The carriage hunts briefly and settles down, at the position corresponding to the speed ratio defined by the tape, with the linkage wheels in the equilibrium orientation about axis 44 illustrated in FIG. 5. If there is jerking or acceleration in the drive, slack may reappear, but it will not persist for any uniformly applied drive, whether applied to the reels, to the linkage mechanism or to the tape. The drive is of course advantageously applied to the tape, since a uniform angular speed for a capstan engaging the tape produces a uniform lineal speed for the tape, whereas a nonuniform angular speed would have to be applied to either of the reels, or to the linkage wheels, to produce a uniform lineal tape speed.

The tension under which the tape is held can be adjusted by the spring 58. The stiffer this spring (i.e. the less its compliance), the greater the tension on the tape.

FIGS. 7 to 10 illustrate a somewhat simplified embodiment of the invention, incorporated into a self-contained magazine of tape well adapted for use in home sound-recording and reproduction equipment, for example.

Figure 8:
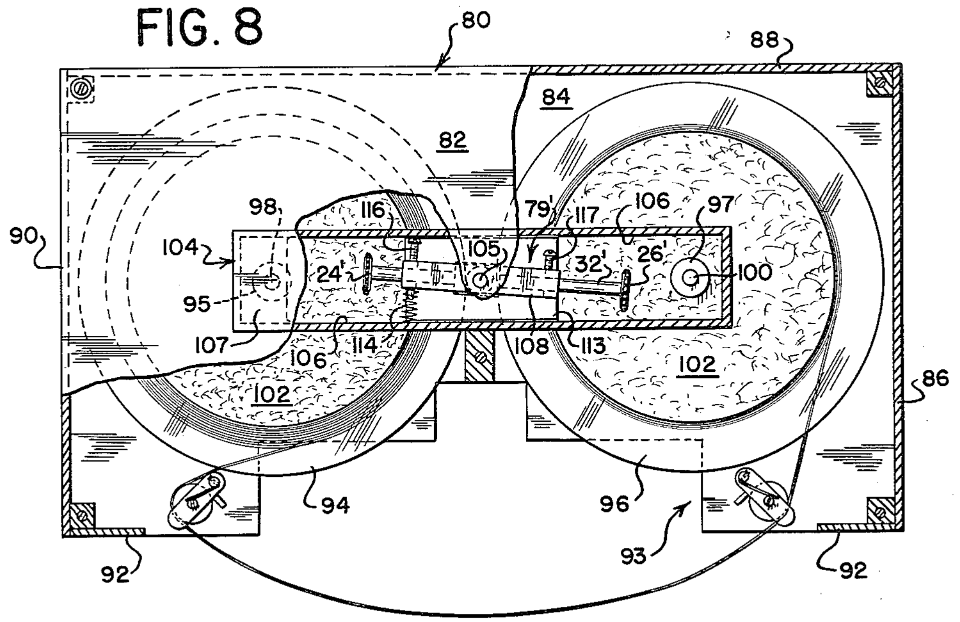
FIG. 8 is a plan view, partly broken away, of the embodiment of FIG. 7.

A housing generally indicated at 80 includes a top wall 82 and bottom wall 84 (FIG. 7), and four side walls 86, 88, 90 and 92 (FIG. 8). The top, bottom and front walls are cut away to provide a free reentrant portion or opening 93 across which the record medium may pass for engagement with a recording or playback transducer, 74' and with a capstan 76', indicated in dashed lines in FIG. 9. Two reels 94 and 96 are journaled for rotation on stub shafts 95 and 97 (FIG. 7) affixed to the bottom wall to rotate about spaced parallel axes indicated at 98 and 100. The upper surface of each reel, as seen in FIG. 8, has affixed concentrically thereto a disk 102 of material having a good coefficient of friction with linkage wheels 24' and 26'. These form part of a coupling generally indicated at 79'. This coupling is supported within a box-like enclosure generally indicated 104 (FIG. 7) which fits over a rectangular aperture 106 (FIG. 8) provided in top wall 82 between the reel axes 98 and 100. The linkage wheels 24' and 26' are pinned to a common shaft 32', and engage each one of the reels 94 and 96 at the disk 102 thereon. They are moreover mounted for translation together back and forth between the reel axes 98 and 100, and for rotation together about an axis parallel to the reel axes, with a spring 114 biasing them to an orientation which renders their individual axes (collinear with the axis of shaft 32') skew with respect to the reel axes. The translatable carriage of the embodiment of FIGS. 1 to 6 is dispensed with. Instead, the linkage wheels 24', 26' with their coupling shaft 32' are supported in a yoke 108 which is pivoted on a stub shaft 105 in the top wall 107 of enclosure 104 for rotation about an axis 110 (FIG. 10) parallel to and fixed with respect to the reel axes 98 and 100. The yoke is slotted at its ends to receive the shaft 32', and carries a double cantilever spring 112 which bears against the shaft 32' at each end of the yoke, stressing the wheels 24' and 26' into engagement with the reels at disks 102. A plate 113 of U-shape, frictionally engaged on its side limbs between the adjacent faces of the side walls of enclosure 104, may be provided to hold the coupling wheels and their shaft 32' in position in the yoke during assembly of the apparatus.

The length of the yoke is made substantially less than the separation of wheels 24' and 26', so that the wheels can move lengthwise of their own common axis with respect to the yoke, to provide varying speed ratios between the reels.

Figure 9:
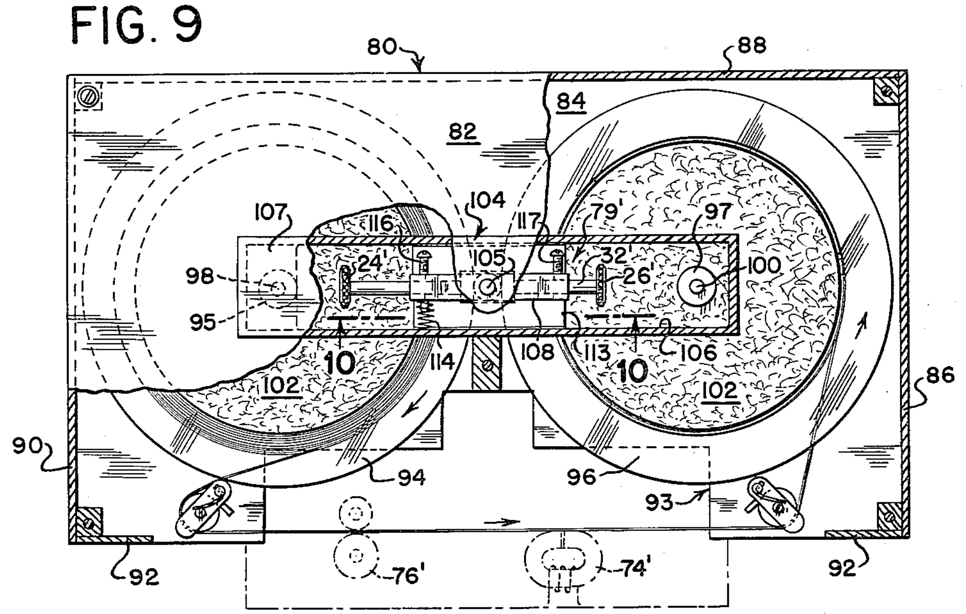
FIG. 9 is a view similar to that of FIG. 8 but showing the apparatus of FIG. 7 in the equilibrium condition obtaining when the tape is being driven from one reel to the other.
Figure 10:
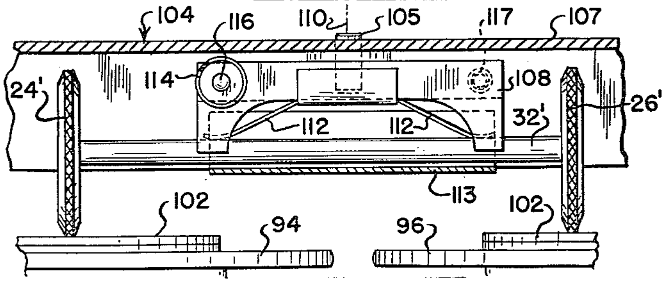
FIG. 10 is a fragmentary sectional view taken on the line 10—10 of FIG. 9.

The operation of the embodiment of FIGS. 7 to 10 is substantially the same as that of the embodiment of FIGS. 1 to 6. A spring 114 is engaged between yoke 108 and a side wall of the enclosure 104, biasing the linkage wheels 24' and 26' to a skew position with respect to the axes 98 and 100 of the reels. Screws 116 and 117 are provided in the yoke to serve, by engagement with a side wall of enclosure 104, as stops limiting the extent of the skew relation reachable by the linkage wheels. As in the embodiment of FIGS. 1 to 6, the range of translational motion available to the linkage wheels is sufficient to make the extreme values of the speed ratio for the reels corresponding to the limits of that motion as great or greater than the extreme values of the speed ratio of the reels which correspond to a full condition for one reel and an empty condition for the other. When the tape is driven at uniform speed, in either direction, the linkage wheels align themselves with their axes parallel to the plane defined by the reel axes 98 and 100. The yoke is advantageously so constructed and mounted that under these conditions, as illustrated in FIG. 9, the axes of the linkage wheels then lie in the plane of the reel axes, so that the linkage wheel axes intersect the axes 98 and 100. If the mounting of the linkage wheels will not permit them simultaneously to assume positions in which their axes intersect the reel axes, the position of equilibrium will nonetheless be that in which their axes are parallel to the plane defined by the reel axes, and therefore horizontal in the showing of FIG. 9.

In view of the unequal lengths of the lever arms between the wheels 24' and 26' and the pivot axis 110 of yoke 108 for all positions of the linkage except that which provides a one-to-one speed ratio of the reels, the embodiment of FIGS. 7 to 10 may show some loss of uniformity in the tension applied to the tape, as the proportion of tape on the two reels changes. In practice however the embodiment of FIGS. 7 to 10 gives wholly satisfactory results nonetheless.

While the invention has been described herein in terms of two exemplary and presently preferred embodiments, various modifications may be made in the apparatus disclosed without departing from the scope of the invention itself, which is intended to be set forth in the appended claims.

For example, if it is desired that the two reels rotate in the same direction, one way of achieving such a result, in addition to the obvious one of gearing one reel to one of the disks in an embodiment such as that shown in FIGS. 1 to 6, is to duplicate the apparatus of those figures, making however one disk common to both sets of apparatus. In such an arrangement, a third disk might be disposed to the right of disk 2 in FIGS. 4 and 5, supported on the same plate 14, and this disk would be coupled to the disk 2 by a second linkage 79 which might be identical with that shown in FIGS. 4 and 5. The third disk would then rotate in the same direction as the disk 4. The tape would then be led onto the extreme sides of the two outer disks, or onto their near sides. In such an arrangement the ratio of the speed of the supply reel to the speed of the take-up reel would be the product of the separate ratios established at the two linkages, and it would be desirable to tie the carriages of the two linkages together as regards their translation so as to minimize hunting, in view of the fact that there is an infinite number of pairs of factors into which the overall speed ratio can be factored.

The linkage can also be otherwise disposed than in the embodiments illustrated. Thus for certain applications, it may be desirable to dispose the linkage between the flanges of the reels, in order to minimize the thickness of the complete apparatus.

While the invention has been described in terms of its application to tape-shaped record media (which of course may include photographic film as well as other strip-shaped record carriers), it may be used with filamentary record media such as wires as well, the level-winding devices customarily used in the reeling of wire record media being provided if desired.

In the embodiments which have been illustrated, the linkage wheels are spaced apart by a distance less than the separation of the axes of the disks which they engage. While the separation of the linkage wheels should be different from that of those axes, it may be greater than that separation instead of less. It should be different because it is by virtue of such a difference that translation of the linkage wheels produces an increase in the speed of one disk relative to the linkage wheel engaging it and a decrease in the speed of the other disk relative to the linkage wheel engaging that other disk, and hence an additive (instead of a subtractive and hence a net zero) change in the relative speeds of the two disks with respect to each other.

Stated in somewhat simpler terms, it is by virtue of the difference between the spacing of the linkage wheels on the one hand and the spacing of the disk axes on the other hand that translation of the disk coupling mechanism, i.e. of the linkage wheels, increases the radius on one disk at which its linkage wheel engages it and reduces the radius on the other disk at which the other linkage wheel engages that other disk.

When the two spacings referred to in the last paragraph are different, the skew orientation of the linkage wheel axes with respect to the disk axes (which exists except when a limiting value is imposed on the speed ratio of the disks by a taut tape) insures that on one disk, rotation of that disk and of the linkage wheel which engages it will be accompanied by a rolling of the linkage wheel over the surface of the disk toward the periphery of that disk and (if that disk is driven, as by the pulling of tape therefrom) by a simultaneous carrying of that linkage wheel by its disk in a direction having a component parallel to the plane defined by the disk axes. Under these same conditions, rotation of the other disk and of the other linkage wheel which engages it will be accompanied by a rolling of that other linkage wheel in a direction having a component directed toward the axis of that other disk, and by a simultaneous carrying of that other linkage wheel by its disk (if it is driven) in a direction having a component parallel to the plane defined by the disk axes and in the same sense as the component of motion of the first linkage wheel parallel to that plane.

Thus referring to FIG. 4, and assuming the tape (with slack between the reels) to be pulled off a reel affixed to disk 4 to rotate that disk counterclockwise as seen in FIG. 4, such disk rotation will bodily carry wheel 26 in a direction having a rightward component parallel to the plane defined by axes 10 and 12. That disk rotation will also produce rotation of wheels 26 and 24 in a direction counterclockwise as observed from the right side of the figure, and this rotation of wheel 26 on disk 4 will shift the point of contact between members 4 and 26 to positions radially farther from the disk axis 12.

The rotation of wheel 24 effects rotation of disk 2, and these rotations cause the point of contact of wheel 24 and disk 2 to shift to positions radially closer to axis 10, as is permitted by the translation of the entire coupling 79 to the right.

Wholly comparable results may be obtained, but with an inversion of the supply and take-up functions for the two reels for a given pattern of directions of rotation, if the separation of wheels 24 and 26 is greater than, instead of lesser than, the separation of axes 10 and 12.

As has already been indicated, a reversal of the direction of skew to which the linkage wheels are biased by the spring or other resilient means which tends to rotate them about the axis of rotation which they possess transverse to their own axes, inverts the supply and take-up functions of the reels for a given pattern of directions of rotation for the disks.

The word skew is used herein to mean a non-intersecting condition of two axes. For both of the possible skew orientations of the linkage wheels available (according, e.g., to the clockwise or counterclockwise stress exerted by the springs 58 and 114 of FIGS. 4 and 8), the linkage wheels, in both of the illustrated embodiments, engage the disks at points on opposite sides of the plane defined by the parallel disk axes.

The take-up reel, as has already been indicated, is the reel whose speed increases with the translation of the coupling mechanism induced by the skew orientation of the linkage wheel and disk axes. This reel may be identified as the one on whose disk there exists an acute angle between the radius from the disk axis to the point of disk-linkage wheel engagement and the direction from that point of engagement toward the portion of the linkage wheel which approaches the disk with disk and linkage wheel rotation.

Thus if disk 4 rotates clockwise as seen in FIG. 4, it is the upper edge of wheel 26, as seen in that figure, which approaches the disk with rotation, i.e. moves down into the plane of the figure. The angle between the radius on disk 4 from axis 12 to the point of contact betweeen members 4 and 26 and the direction in the plane of that disk from that point of contact toward the upper edge of wheel 26 is an acute one, of less than 90°. Hence for this direction of rotation of disk 4 the carriage moves to the left in FIG. 4, and the speed of disk 4 increases with such carriage motion. This makes disk 4 the disk of the take-up reel for the pattern of disk rotation in which disk 4 moves clockwise and disk 2 counterclockwise as seen in FIG. 4.

In FIG. 4, for counterclockwise rotation of disk 2, the angle between the radius in the plane of disk 2 from axis 10 to the point of engagement between members 2 and 24 and the direction from that point of engagement toward the upper edge of wheel 24 (as seen in that figure), which is also moving down into the plane of the figure, is an obtuse one, of more than 90°. Upon counterclockwise rotation of disk 2 in FIG. 4 therefore the point of contact between disk 2 and wheel 24 moves out from axis 10, and the speed of disk 2 declines relative to that of wheel 24 with such motion.

Hence for this pattern of directions of rotation and for the skew orientation shown in FIG. 4, disk 4 is associated with the take-up function and disk 2 with the supply function. This determines the way in which the tape must be laid onto the reels as that illustrated in FIGS. 5 and 2. It will be realized that the stress exerted by spring 58 tends to rotate the linkage wheels about their axis 44 in a direction which appears clockwise in the top plan view of FIG. 2.

Similarly in FIG. 8, shaft 32' is rotated about axis 110 in a direction which appears clockwise in that figure. Hence for clockwise rotation of disk 94 as seen in FIG. 8 the angle under consideration is obtuse, and with such rotation disk 94 acts as supply reel. The concomitant rotation of disk 96 is counterclockwise, and the angle under consideration is for such rotation acute. This dictates the same laying on of the tape, as may be seen from a comparison of FIGS. 2 and 8.

If now in the embodiment of FIGS. 1–6 the stress of spring 58 or in the embodiment of FIGS. 7–10 the stress of spring 114 were reversed, so that as seen in FIG. 4 shaft 32 would be rotated clockwise about axis 44 or so that as seen in FIG. 8 shaft 32' would be rotated counterclockwise, the required laying on the tape would be reversed, to cause tape to be taken up by reel 16 (FIG. 2) or by reel 94 (FIG. 8) for clockwise rotation of those reels as seen in those figures, and to be supplied by reel 18 (FIG. 2) or by reel 96 (FIG. 8) for counterclockwise rotation of reels 18 and 96 as seen in those figures.

It is also to be understood of course, that consistently with the invention the linkage mechanism may be permanently or semi-permanently built into an intelligence recording and/or reproducing apparatus while a magazine containing two reels, much like that of FIGS. 6 to 10 but without the linkage or coupling mechanism 79', is constructed to be removably inserted into such apparatus, for association therein with such a mechanism as well as with transducer and tape (or other elongated record medium) drive elements. The magazine in such an embodiment might be much like that shown in FIG. 8, but without the housing 104 and without the mechanism 79' therein, but with apertures in the wall 82 to permit engagement of disks 102 with the linkage wheels of such a mechanism upon insertion of the magazine into such an apparatus.

I claim:

1. Record medium storage apparatus comprising two disks mounted for rotation about spaced parallel axes, each of said disks being adapted to drive a reel, and means coupling said disks for rotation together, said coupling means comprising a carriage mounted for reversible translation between said disks along a path substantially perpendicular to said axes and parallel to the plane defined by said axes, a shaft, two wheels affixed to said shaft at a separation different from the separation of said axes, means supporting said shaft from said carriage for rotation about its own axis and for separate rotation about a transverse axis parallel to said parallel axes, the support of said shaft from said carriage being such that when said shaft is parallel to the plane defined by said parallel axes, its said own axis lies in that plane, and resilient means engaged between said carriage and shaft support means tending to rotate said shaft about said transverse axis to positions in which the axes of said wheels are skew to the axes of said disks.

2. A record tape magazine comprising a housing and two flanged reels journaled within the housing for independent rotations about spaced axes, a wall of said housing being apertured to expose to the exterior of said housing a portion of each of said reels, said portions lying between said axes, said magazine further comprising exteriorly of said housing two wheels each frictionally engaging one of said reels at one of said portions, means linking said wheels together for rotation about a common axis at fixed relative speeds, and resilient means biasing said linking means to positions in which said common axis is skew to the axes of said reels.

References Cited in the file of this patent

UNITED STATES PATENTS

| | | |
|---|---|---|
| 2,609,998 | Sear | Sept. 9, 1952 |
| 2,612,565 | Heller | Sept. 30, 1952 |
| 2,914,266 | Connell | Nov. 24, 1959 |
| 2,919,866 | Minott | Jan. 5, 1960 |